US012542085B2

(12) United States Patent
Kim et al.

(10) Patent No.: US 12,542,085 B2
(45) Date of Patent: Feb. 3, 2026

(54) METHOD FOR CONTROLLING REFRESH RATE, AND ELECTRONIC DEVICE SUPPORTING SAME

(71) Applicant: SAMSUNG ELECTRONICS CO., LTD., Suwon-si (KR)

(72) Inventors: Hojin Kim, Suwon-si (KR); Jaehun Cho, Suwon-si (KR); Jeehong Kim, Suwon-si (KR); Eunsook Seo, Suwon-si (KR); Minwoo Lee, Suwon-si (KR); Hyuntaek Lee, Suwon-si (KR); Donghyun Yeom, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 6 days.

(21) Appl. No.: 18/338,356

(22) Filed: Jun. 21, 2023

(65) Prior Publication Data

US 2023/0335037 A1 Oct. 19, 2023

Related U.S. Application Data

(63) Continuation of application No. PCT/KR2022/000660, filed on Jan. 13, 2022.

(30) Foreign Application Priority Data

Feb. 16, 2021 (KR) ........................ 10-2021-0020485

(51) Int. Cl.
*G09G 3/20* (2006.01)

(52) U.S. Cl.
CPC ... *G09G 3/2092* (2013.01); *G09G 2320/0261* (2013.01); *G09G 2320/103* (2013.01);
(Continued)

(58) Field of Classification Search
CPC ......... G09G 3/2092; G09G 2320/0261; G09G 2320/103; G09G 2320/106; G09G 2330/021; G09G 2340/0435
See application file for complete search history.

(56) References Cited

U.S. PATENT DOCUMENTS

2002/0021275 A1 2/2002 Kataoka et al.
2008/0158113 A1* 7/2008 Ozawa ................ G09G 3/3406 345/77

(Continued)

FOREIGN PATENT DOCUMENTS

JP 2002-62838 A 2/2002
JP 2003-36046 A 2/2003

(Continued)

OTHER PUBLICATIONS

International Search Report mailed Apr. 20, 2022 for PCT/KR2022/000660.

(Continued)

*Primary Examiner* — David Tung
(74) *Attorney, Agent, or Firm* — CANTOR COLBURN LLP

(57) ABSTRACT

An electronic device includes a display, and at least one processor. The at least one processor is configured to obtain an image; identify whether or not the luminance of the display equals to or is higher than a predetermined luminance; when the luminance of the display equals to or is higher than the predetermined luminance, identify the FPS of the image and the motion information of a scene of the image to be displayed by means of the display, and determine a refresh rate of the display based on the FPS of the image and the motion information of the scene; and, when the luminance of the display is lower than the predetermined luminance, determine a refresh rate corresponding to the FPS of the image as the refresh rate of the display, and
(Continued)

display the scene of the image by means of the display based on the determined refresh rate.

21 Claims, 8 Drawing Sheets

(52) U.S. Cl.
CPC . *G09G 2320/106* (2013.01); *G09G 2330/021* (2013.01); *G09G 2340/0435* (2013.01); *G09G 2360/16* (2013.01)

(56) References Cited

U.S. PATENT DOCUMENTS

| | | | | |
|---|---|---|---|---|
| 2008/0159401 | A1 | 7/2008 | Lee et al. | |
| 2015/0109346 | A1* | 4/2015 | Taniguchi | G09G 3/3406 345/102 |
| 2015/0194125 | A1 | 7/2015 | Choi et al. | |
| 2017/0116933 | A1 | 4/2017 | Xu | |
| 2018/0247600 | A1* | 8/2018 | Kang | G09G 3/3648 |
| 2019/0043435 | A1 | 2/2019 | Yang et al. | |
| 2019/0180705 | A1 | 6/2019 | Choudha et al. | |
| 2019/0258114 | A1* | 8/2019 | Kwon | H05B 45/12 |
| 2020/0326800 | A1 | 10/2020 | Son et al. | |
| 2020/0336716 | A1 | 10/2020 | Kwon | |
| 2021/0074226 | A1* | 3/2021 | Ikeyama | G09G 3/3426 |
| 2021/0168419 | A1 | 6/2021 | Lee et al. | |
| 2022/0254290 | A1* | 8/2022 | Ogura | H04N 7/0127 |

FOREIGN PATENT DOCUMENTS

| | | | |
|---|---|---|---|
| JP | 2010-85683 | A | 4/2010 |
| JP | 2017-151141 | A | 8/2017 |
| JP | 2018-173619 | A | 11/2018 |
| KR | 20080064072 | A | 7/2008 |
| KR | 10-2013-0097566 | A | 9/2013 |
| KR | 20150081761 | A | 7/2015 |
| KR | 10-2018-0002880 | A | 1/2018 |
| KR | 10-2019-0010129 | A | 1/2019 |
| KR | 10-2019-0067981 | A | 6/2019 |
| KR | 10-2020-0056096 | A | 5/2020 |
| KR | 10-2020-0121440 | A | 10/2020 |

OTHER PUBLICATIONS

Korean Office Action for KR Application No. 10-2021-0020485 mailed on Feb. 27, 2025.

* cited by examiner

METHOD FOR CONTROLLING REFRESH RATE, AND ELECTRONIC DEVICE SUPPORTING SAME

This application is a continuation application under, 35 U.S.C. § 111(a), of International Patent Application No. PCT/KR2022/000660, filed on Jan. 13, 2022, which claims priority to Korean Patent Application No. 10-2021-0020485, filed on Feb. 16, 2021, the content of which in their entirety is herein incorporated by reference.

BACKGROUND

1. Field

Various embodiments of the disclosure relate to a method of controlling a refresh rate and an electronic device supporting the same.

2. Description of the Related Art

Along with the development of display technology, electronic devices with displays capable of displaying a screen at a high refresh rate (e.g., 120 Hz) have been released. A refresh rate may indicate the number of times a screen (e.g., one image frame) is displayed (or reproduced) per second, and may be also referred to as a scan rate or a refresh rate.

An electronic device may provide a livelier image (e.g., an image represented smoothly without afterimages caused by a motion of the image) to a user by displaying an image (e.g., a game video) including a relatively large motion (e.g., in the case of many changes in pixel values between image frames) on a display at a relatively high refresh rate.

SUMMARY

An electronic device may display an image at a refresh rate corresponding to (e.g., mapped to) the frames per second (FPS), of the image through a display. For example, when the FPS of an image is 60 fps, the electronic device may display the image at a refresh rate of 60 Hz corresponding to the FPS of the image through the display.

When the electronic device displays an image at a refresh rate corresponding to the FPS of the image regardless of a motion of the image (e.g., a motion degree of the image), the electronic device may provide a sense of liveliness to a user, when displaying an image including a relatively large motion. On the contrary, when displaying an image including a relatively small motion, the electronic device may unnecessarily consume power.

Various embodiments of the disclosure relate to a method for controlling a refresh rate, in which an image may be displayed at a refresh rate determined based on the FPS of the image and motion information of each scene of the image, and an electronic device supporting the same.

The technical objects to be achieved by the disclosure are not limited to what has been described above, and those skilled in the art will understand clearly other unmentioned technical objects from the following description.

An electronic device in various embodiments of the disclosure may include a display and at least one processor operatively coupled to the display. The at least one processor may be configured to obtain an image, identify whether a luminance of the display is equal to or greater than a specified luminance, when the luminance of the display is equal to or greater than the specified luminance, identify a frame rate, e.g., frames per second (FPS), of the image and motion information of a scene of the image to be displayed through the display, and determine a refresh rate of the display based on the FPS of the image and the motion information of the scene, when the luminance of the display is less than the specified luminance, determine a refresh rate corresponding to the FPS of the image as the refresh rate of the display, and display the scene of the image through the display based on the determined refresh rate.

A method of controlling a refresh rate in an electronic device in various embodiments of the disclosure may include obtaining an image, identifying whether a luminance of a display of the electronic device is equal to or greater than a specified luminance, when the luminance of the display is equal to or greater than the specified luminance, identifying FPS of the image and motion information of a scene of the image to be displayed through the display, and determining a refresh rate of the display based on the FPS of the image and the motion information of the scene, when the luminance of the display is less than the specified luminance, determining a refresh rate corresponding to the FPS of the image as the refresh rate of the display, and displaying the scene of the image through the display based on the determined refresh rate.

A method of controlling a refresh rate and an electronic device supporting the same in various embodiments of the disclosure displays an image at a refresh rate determined based on the frames per second (FPS) of the image and motion information of each scene of the image. Therefore, the power consumption of the electronic device may be reduced without degrading image quality.

BRIEF DESCRIPTION OF DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
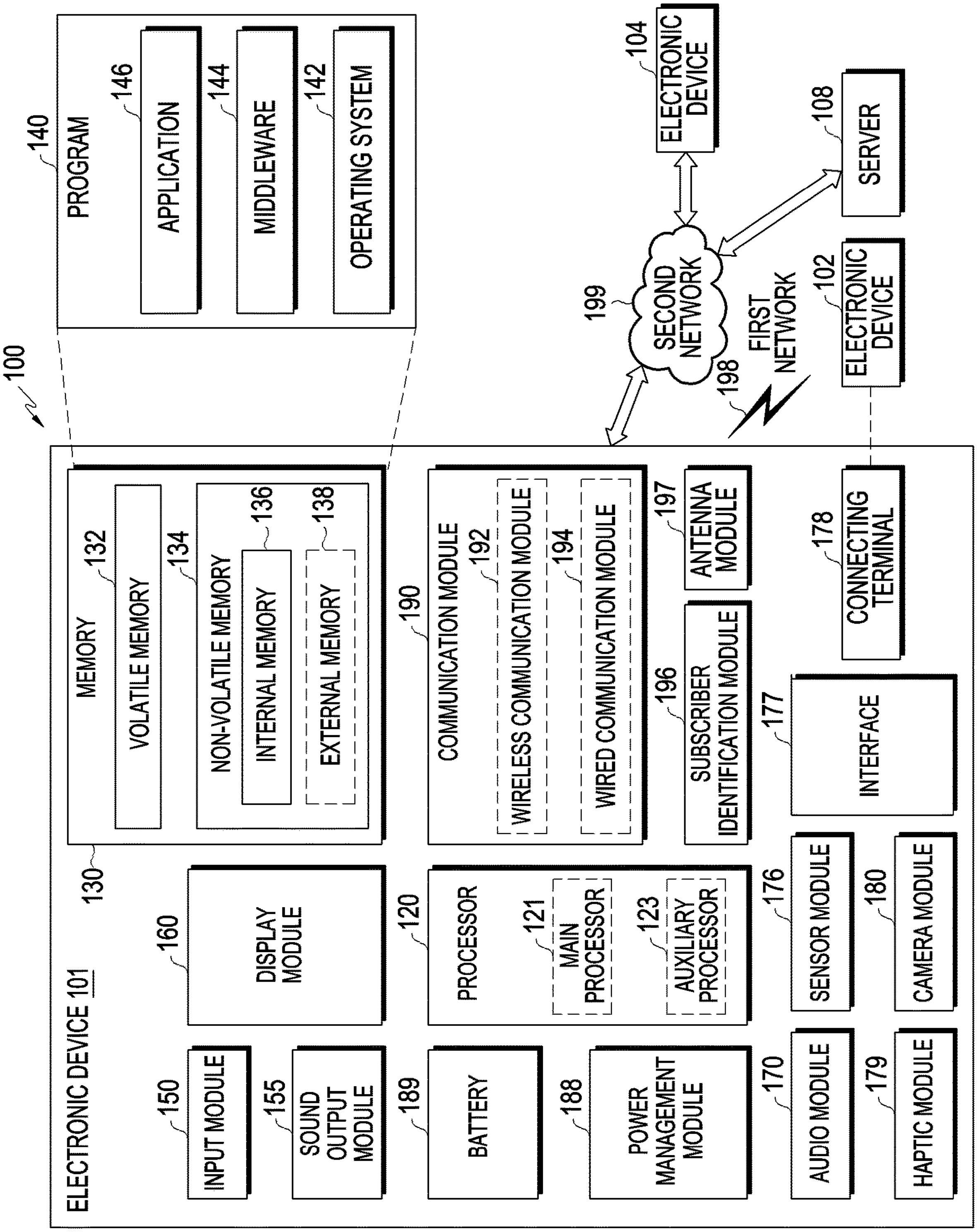
FIG. 1 is a block diagram illustrating an embodiment of an electronic device in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing units (CPU) or an application processor (AP)), or an auxiliary processor 123 (e.g., a graphics processing units (GPU), a neural processing units (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 millisecond (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a board (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a PCB, a RFIC disposed on a first surface (e.g., the bottom surface) of the PCB, or adjacent to the first surface and capable of supporting a specified high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a units implemented in hardware, software, or firmware, and may interchangeably be used with other terms, for example, logic, logic block, part, or circuitry. A module may be a single integral component, or a minimum units or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
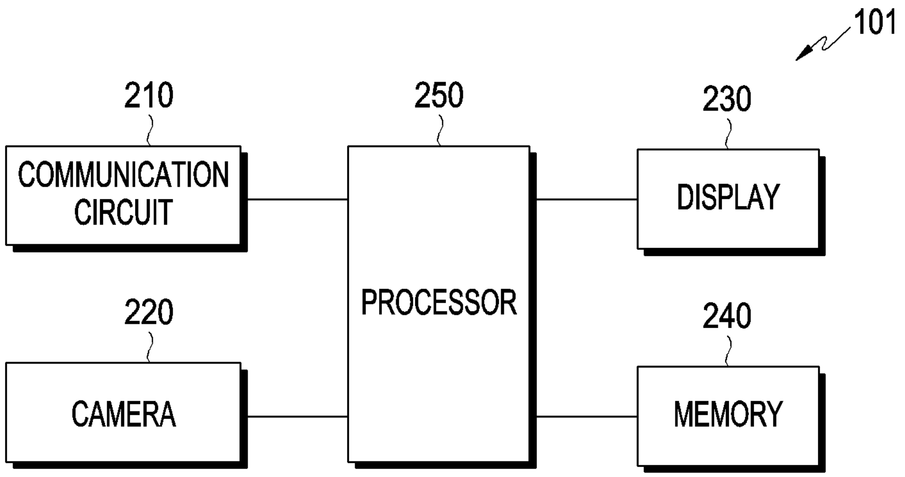
FIG. 2 is a block diagram illustrating an embodiment of an electronic device.

FIG. 2 is a block diagram illustrating an embodiment of an electronic device 101.

Referring to FIG. 2, in an embodiment, the electronic device 101 may include a communication circuit 210, a camera 220, a display 230, memory 240, and/or a processor 250.

In an embodiment, the communication circuit 210 may be included in the communication module 190 of FIG. 1.

In an embodiment, the communication circuit 210 may receive an image from an external electronic device (e.g., the server 108 or another electronic device (e.g., the electronic device 102 or the electronic device 104)). In an embodiment, the communication circuit 210 may receive a high dynamic range (HDR) image from the external electronic device, for example. However, the image received by the communication circuit 210 from the external electronic device is not limited to an HDR image, and may include a standard dynamic range (SDR) image. In an embodiment, the communication circuit 210 may receive an image from the external electronic device by real-time streaming or downloading.

In an embodiment, the camera 220 may be included in the camera module 180 of FIG. 1.

In an embodiment, the camera 220 may obtain an image. In an embodiment, the camera 220 may obtain an HDR image under the control of the processor 250, for example. However, the image obtained by the camera 220 is not limited to an HDR image, and may include an SDR image.

In an embodiment, the display (e.g., display device) 230 may be included in the display module 160 of FIG. 1. In an embodiment, the display 230 may operate at a variable refresh rate. In an embodiment, the display 230 may display an image according to a refresh rate (hereinafter, a "refresh rate of the display" and a 'refresh rate' are interchangeably used) determined based on a frame rate, e.g., the frames per second (FPS), of the image, the luminance of the display, and/or motion information of a scene of the image, for example. A method of displaying an image according to a refresh rate determined based on the FPS of the image, the luminance of the display, and/or motion information of a scene of the image by the display 230 will be described later in detail.

In an embodiment, the memory 240 may be included in the memory 130 of FIG. 1.

In an embodiment, the memory 240 may store an image. In an embodiment, the memory 240 may store an image received from an external electronic device or obtained from the camera 220, for example. In an embodiment, the memory 240 may store information for performing a method of controlling a refresh rate of a display. The information for performing the method of controlling the refresh rate of the display, stored in the memory 240 will be described later in detail.

In an embodiment, the processor 250 may be provided in plural.

In an embodiment, the processor 250 may perform an overall operation to control the refresh rate of the display.

With reference to FIGS. 2 to 9, a method of performing an operation of controlling a refresh rate of a display by the processor 250 will be described below in detail.

The electronic device 101 in various embodiments of the disclosure may include the display 230 and at least one processor 250 operatively coupled to the display 230. The at least one processor 250 may obtain an image, identify whether the luminance of the display 230 is equal to or greater than a specified luminance, when the luminance of the display 230 is equal to or greater than the specified luminance, identify the frames per second (FPS) of the image and motion information of a scene of the image to be displayed through the display 230 and determine a refresh rate of the display 230 based on the FPS of the image and the motion information of the scene, when the luminance of the display 230 is less than the specified luminance, determine a refresh rate corresponding to the FPS of the image as the refresh rate of the display 230, and display the scene of the image through the display 230 based on the determined refresh rate.

In various embodiments, the at least one processor 250 may, when the luminance of the display 230 is changed from a luminance equal to or greater than the specified luminance to a luminance less than the specified luminance during display of the scene through the display 230, determine a refresh rate corresponding to the FPS as a refresh rate for displaying a scene following the scene.

In various embodiments, the at least one processor 250 may, when the luminance of the display 230 is changed from a luminance less than the specified luminance to a luminance equal to or greater than the specified luminance during display of the scene through the display 230, determine a refresh rate for displaying the following scene based on the FPS of the image and motion information of the following scene.

In various embodiments, the specified luminance may be a luminance at a point at which the luminance of the display 230 increases non-linearly and then starts to increase linearly, as the luminance control level of the luminance of the display 230 increases.

In various embodiments, the at least one processor 250 may identify the FPS of the image and motion information of the scene of the image to be displayed through the display 230 based on metadata of the image.

In various embodiments, the metadata may include the duration of at least one scene included in the image and/or motion information of the at least one scene.

In various embodiments, the at least one processor 250 may determine a refresh rate corresponding to the FPS of the image as the refresh rate of the display 230, when the scene is an initial scene of the image.

In various embodiments, as the motion level of the scene increases, the motion information may include a motion level set higher, and the at least one processor 250 may determine the refresh rate of the display as a lower frequency, as the motion level decreases.

In various embodiments, the at least one processor 250 may set a plurality of levels corresponding to a plurality of refresh rates, respectively, identify whether the FPS of the image is greater than a specified FPS, determine a refresh rate corresponding to a level lower than a level corresponding to a refresh rate corresponding to the FPS of the image by a first number of levels as the refresh rate of the display based on the motion information, when the FPS of the image is equal to or less than the specified FPS, and determine a refresh rate corresponding to a level lower than the level corresponding to the refresh rate corresponding to the FPS of the image by a second number of levels greater than the first number of levels as the refresh rate of the display based on the motion information, when the FPS of the image is greater than the specified FPS.

In various embodiments, the at least one processor 250 may obtain an image including a scene, set a plurality of areas in each of a plurality of frames included in the scene, set a plurality of blocks in each of the plurality of areas, calculate first motion vectors of a plurality of first blocks set at positions close to a frame center among the plurality of blocks and second motion vectors of a plurality of second blocks set at positions far from the frame center, calculate third motion vectors of each of the plurality of areas by assigning a first weight to the average of the second motion vectors and assigning a second weight greater than the first weight to the average of the first motion vectors, identify the largest of the third motion vectors, and obtain motion information of the scene based on the identified largest motion vector.

Figure 3:
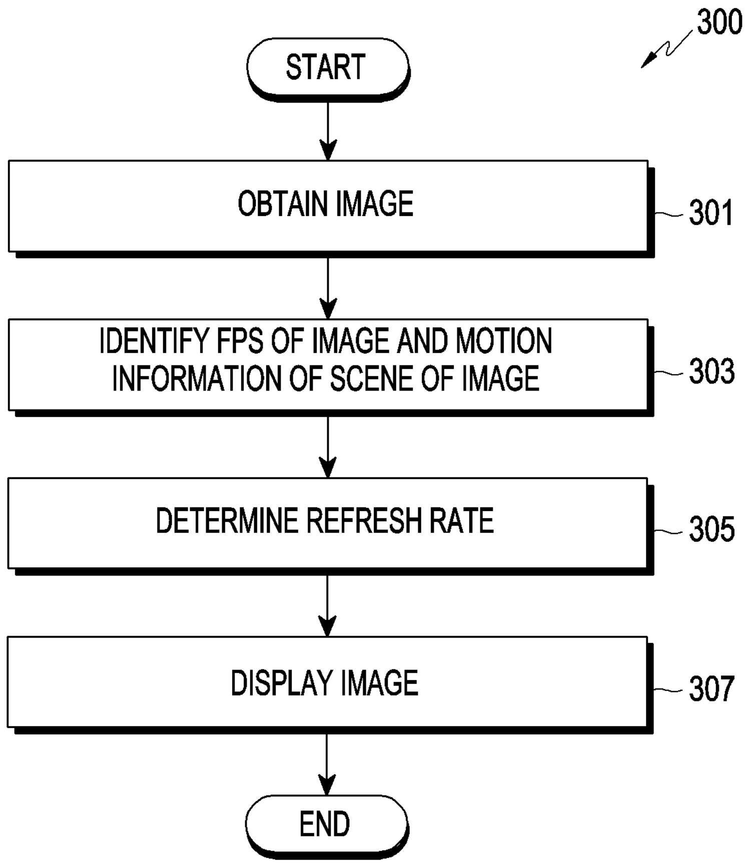
FIG. 3 is a flowchart illustrating an embodiment of a method of controlling a refresh rate.

FIG. 3 is a flowchart 300 illustrating an embodiment of a method of controlling a refresh rate.

Referring to FIG. 3, in an embodiment, the processor 250 may obtain an image in operation 301.

In an embodiment, the processor 250 may obtain an image from an external electronic device through the communication circuit 210. In an embodiment, the processor 250 may receive the image from the external electronic device through the communication circuit 210 by real-time streaming or downloading, for example. In an embodiment, the processor 250 may obtain an image through the camera 220. In an embodiment, the processor 250 may obtain an image from the memory 240.

In an embodiment, the processor 250 may obtain an image based on a user input. In an embodiment, the processor 250 may obtain an image using an image application (e.g., a video application, a web application, or a gallery application) based on a user input for displaying the image, for example.

In an embodiment, the image obtained by the processor 250 may be an HDR image. However, the image obtained by the processor 250 may be an SDR image, not limited to an HDR image.

In an embodiment, the image obtained by the processor 250 may include image data (e.g., a plurality of frames) and metadata. When the image obtained by the processor 250 is an HDR image, the image may include dynamic metadata. When the image obtained by the processor 250 is an SDR image, the image may include metadata (e.g., static metadata).

In operation 303, in an embodiment, the processor 250 may identify the FPS (also referred to as "frame rate") of the image and motion information of a scene of the image to be displayed through the display 230.

In an embodiment, the processor 250 may identify the FPS of the image and the motion information of the scene of the image to be displayed through the display 230 based on the metadata of the image (hereinafter, interchangeably used with 'metadata'). In an embodiment, the metadata of the image may include information about at least one of the FPS of the image (e.g., the number of frames of the image obtained per second during mastering of the image (e.g., generation of the image)), the duration of at least one scene included in the image (and/or a start position of the at least one scene included in the image), and motion information of the at least one scene included in the image, for example. However, the information included in the metadata of the image is not limited to the above embodiment.

In an embodiment, the at least one scene included in the image may include a plurality of consecutive obtained frames. In an embodiment, the at least one scene included in the image may be identified (or distinguished) based on the duration and/or start point of each of the at least one scene. In an embodiment, the at least one scene may be obtained from a plurality of frames obtained during image mastering (e.g., image acquisition) based on a correlation between histograms of each of the plurality of frames. In an embodiment, a scene change may be detected based on the correlation between the histograms of each of the plurality of frames obtained during the image mastering, for example. At least one frame to be included in each of the at least one scene may be determined based on the scene change.

In an embodiment, the duration of each of the at least one scene may be obtained (e.g., calculated) based on the number of frames included in each of the at least one scene and the FPS of the image. In an embodiment, when the image includes a first scene and a second scene, the duration of the first scene may be calculated by dividing the number of frames included in the first scene by the FPS of the image, and the duration of the second scene may be calculated by dividing the number of frames included in the second scene by the FPS of the image, for example.

In an embodiment, motion information of the at least one scene included in the image may indicate a motion degree of each of the at least one scene. In an embodiment, the motion degree of each of the at least one scene may be obtained (or calculated) based on motion vectors of frames included in each of the at least one scene (e.g., of consecutive obtained frames included in each of the at least one scene) (e.g., based on changes in pixel values of each of the consecutive frames).

In an embodiment, the motion information of the at least one scene, included in the metadata of the image may include a motion level of each of the at least one scene. In an embodiment, the motion level may be set to correspond to a motion degree range of each of the at least one scene. In an embodiment, when the motion degree is in the range of 0 to 40 (e.g., the motion degree is 0 for a minimum motion and 40 for a maximum motion), the motion level may be set to level 0 (e.g., motion level 0 as the lowest motion level) for a motion degree of 0 or more to less than 10, to motion level 1 for a motion degree of 10 or more to less than 20, to motion level 2 for a motion degree of 20 or more to less than 30, and to motion level 3 (e.g., motion level 3 as the highest motion level) for a motion degree of 30 or more to less than 40, for example. Although it has been described that the motion levels include four motion levels such as motion level 0 to motion level 3 based on motion degrees in the above embodiment, the disclosure is not limited thereto. In an embodiment, more or fewer than four motion levels may be set based on motion degrees, for example.

In an embodiment, the motion information (e.g., motion level) of the at least one scene may be stored (or included) in the metadata (e.g., dynamic metadata) (e.g., a reserved area in the metadata).

In the above embodiments, metadata of an image includes information about at least one of the FPS of the image, the duration of at least one scene included in the image, or motion information of the at least one scene included in the image, by way of example, to which the disclosure is not limited. In an embodiment, the metadata of the image may include the FPS of the image without including at least one of the duration of the at least one scene included in the image or the motion information of the at least one scene included in the image. In an embodiment, the processor 250 may receive an image including FPS of the image and image data from an external electronic device through the communication circuit 210, for example. Upon receipt of a user input for displaying the image, the processor 250 may obtain at least one scene from frames of the image (e.g., classify the frames of the image as one scene) by analyzing the received image (e.g., the frames of the image). The processor 250 may obtain the duration of each of the at least one scene based on the number of frames included in each of the at least one scene and the FPS of the image. The processor 250 may obtain motion information of each of the at least one scene included in the image based on a motion degree of frames (e.g., a change in motion between the frames) included in each of the at least one scene. The processor 250 may identify the duration and motion information of a scene to be displayed through the display 230 based on the duration and motion information of each of the at least one scene.

In an embodiment, the processor 250 may receive an image with image data and metadata including the FPS of the image and the duration of at least one scene included in the image without including motion information of the at least one scene from an external electronic device through the communication circuit 210. The processor 250 may obtain (e.g., calculate) the motion information of the at least one scene based on the duration of the at least one scene and the image data (e.g., a plurality of frames of the image). The processor 250 may include (e.g., insert) the at least one piece of obtained motion information in the metadata of the image (e.g., convert the at least one piece of obtained motion information into the metadata). The processor 250 may identify the FPS of the image and motion information of a scene of the image to be displayed through the display 230 based on the metadata including the obtained at least one piece of motion information, the FPS of the image, and the duration of the at least one scene.

In an embodiment, the processor 250 may receive an image with image data and metadata including the FPS of the image without including the duration and motion information of at least one scene from an external electronic device through the communication circuit 210. The processor 250 may obtain (e.g., calculate) the duration and motion information of the at least one scene based on the image data (e.g., a plurality of frames of the image). The processor 250 may include the duration and at least one piece of obtained motion information of the at least one scene in the metadata of the image. The processor 250 may identify the FPS of the image and motion information of a scene of the image to be displayed through the display 230 based on the metadata including the obtained duration of the at least one scene, the obtained at least one piece of motion information, the FPS of the image.

In an embodiment, when the image includes a plurality of scenes, and a first one of the plurality of scenes is being displayed or has been displayed, the processor 250 may identify motion information of a second scene following the first scene (e.g., a second scene consecutive to the first scene) as a scene to be displayed through the display 230.

In operation 305, in an embodiment, the processor 250 may determine a refresh rate of the display based on the FPS of the image and the motion information of the scene to be displayed through the display 230.

In an embodiment, the processor 250 may determine the refresh rate of the display as a refresh rate equal to a refresh rate corresponding to the FPS of the image or a refresh rate lower than the refresh rate corresponding to the FPS of the image, based on the motion information of the scene to be displayed through the display 230. In an embodiment, when the FPS of the image is 60 fps, and the motion level of the scene to be displayed through the display 230 is motion level 3 (e.g., the highest motion level, motion level 3 when the motion levels include motion level 0 to motion level 3), the processor 250 may determine a refresh rate 60 Hz corresponding to the FPS of the image as the refresh rate of the display, for example. In another embodiment, when the FPS of the image is 60 fps, and the motion level of the scene to be displayed through the display 230 is motion level 2, the processor 250 may determine the refresh rate of the display as a refresh rate 48 Hz lower than the refresh rate 60 Hz corresponding to the FPS of the image.

In an embodiment, the processor 250 may determine one of the frequencies listed in [Table 1] below as the refresh rate of the display.

TABLE 1

| Frequency level | Level 8 | Level 7 | Level 6 | Level 5 | Level 4 | Level 3 | Level 2 | Level 1 |
|---|---|---|---|---|---|---|---|---|
| frequency(Hz) | 120 | 96 | 60 | 48 | 30 | 24 | 10 | 1 |

As illustrated in [Table 1], a frequency set as a refresh rate of the display may be one of frequencies corresponding to divisors of 120, 96 Hz, and 48 Hz. In an embodiment, the processor 250 may set frequencies 1 Hz to 120 Hz as level 1 to level 8 of the refresh rate, respectively. In [Table 1], frequencies set as the refresh rates of the display are, but not limited to, 1, 10, 24, 30, 48, 60, 96, and 120 Hz. In an embodiment, the frequencies set as the refresh rates of the display may be frequencies greater than 120 Hz or frequencies less than 120 Hz, and at least some of the frequencies may include frequencies different from the frequencies listed in [Table 1], for example. Further, frequency levels different from the frequency levels listed in [Table 1] may be set. In an embodiment, the level of the refresh rate may decrease from level 8 to level 1 (e.g., level 8 is the highest, and level 1 is the lowest). However, the disclosure is not limited thereto, and the aforementioned frequencies may be differently set in other embodiments.

In an embodiment, the processor 250 may determine a refresh rate lower than a refresh rate corresponding to the FPS of the image by a specified level as the refresh rate of the display, based on motion information of a scene to be displayed through the display 230. In an embodiment, in the case where the motion levels include motion level 0 to motion level 3, and the FPS of the image is 60 fps, when the motion level of the scene to be displayed through the display 230 is motion level 2 (or motion level 1), the processor 250 may determine, as the refresh rate of the display, a refresh rate 48 Hz corresponding to frequency level 5 lower than the frequency level (level 6 in [Table 1]) of the refresh rate 60 Hz corresponding to the FPS of the image by one level, for example. In another embodiment, in the case where the motion levels include motion level 0 to motion level 3, and the FPS of the image is 60 fps, when the motion level of the scene to be displayed through the display 230 is motion level 0 (the lowest of motion level 1 to motion level 4), the processor 250 may determine, as the refresh rate of the display, a refresh rate 30 Hz corresponding to frequency level 4 lower than the frequency level (level 6 in [Table 1]) of the refresh rate 60 Hz corresponding to the FPS of the image by two levels. In another embodiment, in the case where the motion levels include motion level 0 to motion level 3, and the FPS of the image is 60 fps, when the motion level of the scene to be displayed through the display 230 is motion level 3 (the highest of motion level 1 to motion level 4), the processor 250 may determine the refresh rate 60 Hz corresponding to the FPS of the image as the refresh rate of the display.

In an embodiment, even when the motion level of the scene to be displayed through the display 230 is the lowest, the processor 250 may determine the refresh rate of the display to be ½ or higher of the refresh rate corresponding to the FPS of the image. In an embodiment, when the FPS of the image is 120 fps, and the motion level of the scene to be displayed through the display 230 is motion level 0, the processor 250 may determine ½ of the refresh rate 120 Hz corresponding to the FPS of the image, 120 fps, that is, 60 Hz as the refresh rate of the display, for example.

In an embodiment, the processor 250 may determine the refresh rate in different methods depending on whether the FPS of the image is greater than a specified FPS (e.g., 30 fps). In an embodiment, the processor 250 may determine different frequency decrements from the refresh rate corresponding to the FPS of the image (e.g., the number of levels by which a frequency level set for the refresh rate corresponding to the FPS of the image is decreased) for the case where the FPS of the image is greater than the specified FPS and the case where the FPS of the image is equal to or less than the specified FPS, for example. A method of determining a refresh rate according to different methods depending on whether the FPS of an image is greater than a specified FPS by the processor 250 will be described later with reference to FIG. 4.

In an embodiment, the processor 250 may determine a refresh rate differently depending on whether the luminance of the display is equal to or greater than a specified luminance. A method of determining a refresh rate differently depending on whether the luminance of the display is equal to or greater than a specified luminance by the processor 250 will be described later with reference to FIGS. 5 and 6.

In operation 307, in an embodiment, the processor 250 may display the image through the display 230 based on the determined refresh rate (e.g., the refresh rate determined in operation 305). In an embodiment, the processor 250 may control the display 230 to display the scene to be displayed out of the image at the determined refresh rate, for example.

In an embodiment, when the refresh rate corresponding to the FPS of the image is determined as the refresh rate for displaying the scene of the image to be displayed through the display 230, the processor 250 may sequentially display image data (e.g., frames of the image) of all frames included in the scene through the display 230 at the refresh rate corresponding to the FPS of the image.

In an embodiment, when a refresh rate (e.g., 48 Hz) lower than the refresh rate (e.g., 60 Hz) corresponding to the FPS of the image is determined as the refresh rate for displaying the scene of the image to be displayed through the display 230, the processor 250 may display some of all frames included in the scene through the display 230 at the refresh rate lower than the refresh rate corresponding to the FPS of the image.

In FIG. 3, a refresh rate of the display for displaying at least one scene of an image is determined based on the FPS of the image and motion information of the scene, by way of example, to which the disclosure is not limited. In an embodiment, when a plurality of images (e.g., different images) are automatically reproduced continuously, the processor 250 may determine a refresh rate of the display 230 for displaying each of the plurality of images based on the FPS and motion information of each of the plurality of images, for example.

Figure 4:
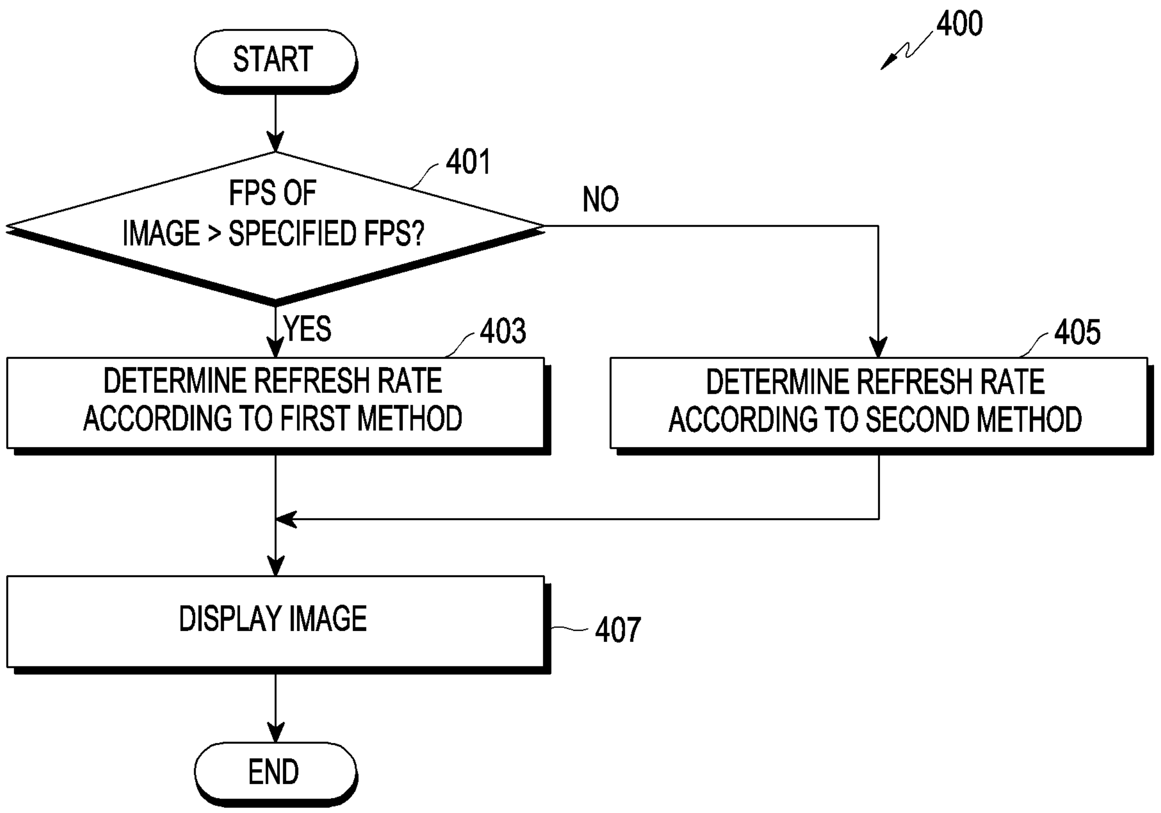
FIG. 4 is a flowchart illustrating an embodiment of a method of determining a refresh rate by different methods depending on whether the frames per second (FPS) of an image is higher than a specified FPS.

FIG. 4 is a flowchart 400 illustrating an embodiment of a method of determining a refresh rate in different methods depending on whether the FPS of an image is greater than a specified FPS.

In an embodiment, the operation of FIG. 4 may be included in operations 305 and 307 of FIG. 3.

Referring to FIG. 4, in an embodiment, the processor 250 may identify whether the FPS of an image is greater than a specified FPS (e.g., 30 fps) in operation 401.

When identifying that the FPS of the image is greater than the specified FPS (e.g., 30 fps) in operation 401, the processor 250 may determine a refresh rate of the display according to a first method in operation 403 in an embodiment.

In an embodiment, in the case whether the motion levels include motion level 0 to motion level 3, and the FPS of the image is 60 fps, when the motion level of a scene to be displayed through the display 230 is motion level 2 (or motion level 1), the processor 250 may determine, as the refresh rate of the display, a refresh rate 48 Hz corresponding to frequency level 5 lower than the frequency level (level 6 in [Table 1]) of a refresh rate 60 Hz corresponding to the FPS of the image by one level, for example. In another embodiment, in the case where the motion levels include motion level 0 to motion level 3, and the FPS of the image is 60 fps, when the motion level of the scene to be displayed through the display 230 is motion level 0 (e.g., the lowest of motion level 0 to motion level 3), the processor 250 may determine, as the refresh rate of the display, a refresh rate 30 Hz corresponding to frequency level 3 lower than the frequency level (level 5 in [Table 1]) of the refresh rate 60 Hz corresponding to the FPS of the image by two levels. In another embodiment, in the case where the motion levels include motion level 0 to motion level 3, and the FPS of the image is 60 fps, when the motion level of the scene to be displayed through the display 230 is motion level 3 (e.g., the highest of motion level 0 to motion level 3), the processor 250 may determine the refresh rate 60 Hz corresponding to the FPS of the image as the refresh rate of the display.

In operation 405, when identifying that the FPS of the image is equal to or less than the specified FPS (e.g., 30 fps) in operation 401, the processor 250 may determine the refresh rate of the display according to a second method in an embodiment.

In an embodiment, in the case where the motion levels include motion levels 0 to 3, and the FPS of the image is 30 fps, when the motion level of the scene to be displayed through the display 230 is motion level 3 (or motion level 2), the processor 250 may determine the refresh rate 30 Hz corresponding to the FPS of the image as the refresh rate of the display, for example.

In another embodiment, in the case where the motion levels include motion level 0 to motion level 3, and the FPS of the image is 30 fps, when the motion level of the scene to be displayed through the display 230 is motion level 0 (or motion level 1), the processor 250 may determine, as the refresh rate of the display, a refresh rate 24 Hz corresponding to frequency level 3 lower than a frequency level (level 4 in [Table 1]) of the refresh rate 30 Hz corresponding to the FPS of the image by one level.

In an embodiment, even when the motion level is the same, when the FPS of the image is less than the specified FPS (e.g., 30 fps), a frequency decrement from the refresh rate corresponding to the FPS of the image may be set small, compared to the case where the FPS of the image is greater than the specified FPS, thereby preventing the degradation of image quality. In an embodiment, as the FPS of an image is smaller, the image (e.g., a scene) may be more easily recognized by the human eye (e.g., the human eye may be sensitive to changes in motion of frames of the image), for example. For motion level 0, when the FPS of the image is greater than the specified FPS (e.g., 30 fps), a refresh rate corresponding to a frequency level lower than a frequency level of a refresh rate corresponding to the FPS of the image by two levels may be determined as the refresh rate of the display, and when the FPS of the image is equal to or less than the specified FPS (e.g., 30 fps), a refresh rate corresponding to a frequency level lower than the frequency level of the refresh rate corresponding to the FPS of the image by one level may be determined as the refresh rate of the display. Therefore, the degradation of image quality may be prevented.

In operation 407, in an embodiment, the processor 250 may display the image (e.g., the scene to be displayed through the display 230) through the display 230 based on the determined refresh rate (e.g., the refresh rate determined in operation 305).

Since at least some of the embodiments of operation 407 are the same as or similar to those of operation 307, a detailed description thereof will be omitted.

Figure 5:
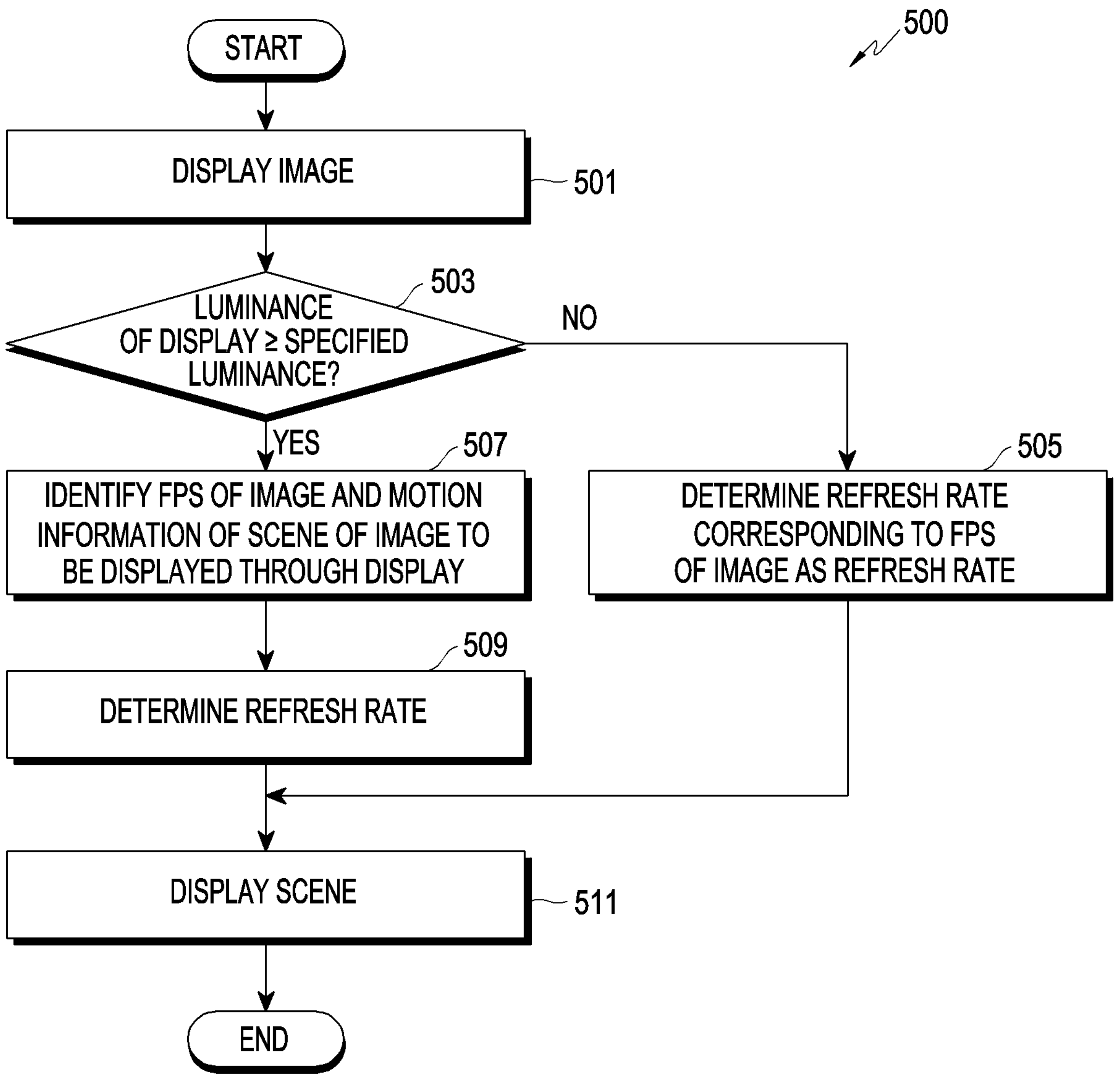
FIG. 5 is a flowchart illustrating an embodiment of a method of controlling a refresh rate.

FIG. 5 is a flowchart 500 illustrating an embodiment of a method of controlling a refresh rate.

Referring to FIG. 5, in an embodiment, the processor 250 may obtain an image in operation 501.

Since at least some of the embodiments of operation 501 are the same as or similar to those of operation 301, a detailed description thereof will be omitted.

In an embodiment, the processor 250 may identify whether the luminance of the display is equal to or greater than a specified luminance in operation 503.

In an embodiment, the processor 250 may change the luminance of the display based on a user input obtained while displaying an image. In an embodiment, the processor 250 may display a user interface for changing the luminance of the display (e.g., a user interface for adjusting the luminance of the display by scrolling an object included in a bar or a user interface for entering a number corresponding to a luminance of the display), for example. The processor 250 may change the luminance of the display based on a user input on the user interface for changing the luminance of the display.

In an embodiment, the processor 250 may change the luminance of the display based on a change in an ambient illuminance. In an embodiment, as an illuminance value detected from external light incident on the electronic device 101 is higher, the processor 250 may set the luminance of the display to be higher, for example.

In an embodiment, the processor 250 may determine whether a current luminance of the display 230 is equal to or greater than a specified luminance. A method of setting a specified luminance compared with a current luminance of the display 230 will be described with reference to FIG. 6.

Figure 6:
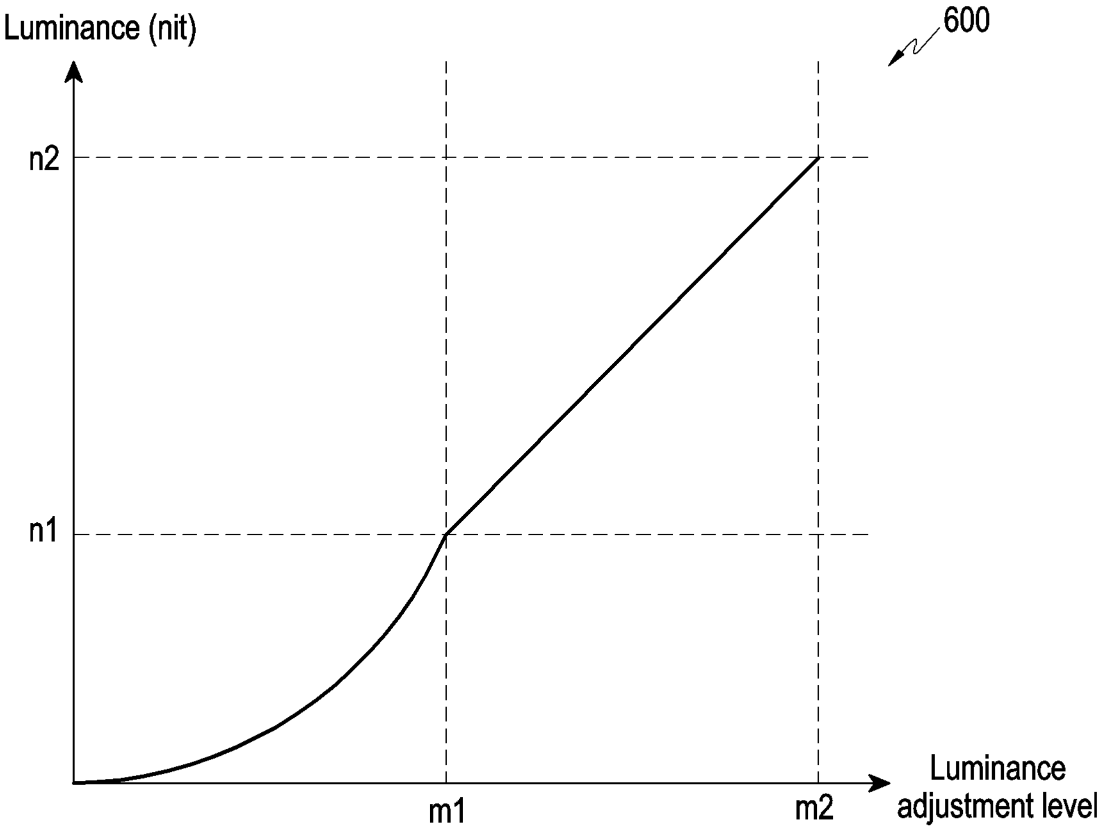
FIG. 6 is a diagram illustrating an embodiment of a method of setting a specified luminance.

FIG. 6 is a diagram 600 illustrating an embodiment of a method of setting a specified luminance.

Referring to FIG. 6, in an embodiment, the graph of FIG. 6 may represent a mapping relationship between luminance adjustment levels (also referred to as 'platform levels') and luminances of the display.

In an embodiment, the luminance adjustment levels may be set to adjust the luminance of the display. In an embodiment, when the maximum luminance of the display 230 is 400 nits, 256 luminance adjustment levels may be set, such as level 0 to level 255. Among the 256 levels, the interval between adjacent levels may be the same, for example. In an embodiment, the interval between level 128 and level 129 may be the same as the interval between level 129 and level 130, for example. In an embodiment, the luminance adjustment levels may correspond to luminance intensities of the display set to adjust the luminance of the display. In an embodiment, to change the luminance of the display, the processor 250 may display a user interface for adjusting the luminance intensity of the display by scrolling an object included in a bar, for example. When the luminance adjustment levels are set as 256 levels, level 0 to level 255, the luminance intensities of the display may be set to 0 to 100 to correspond to the luminance adjustment levels.

In an embodiment, level m2 may be a highest luminance adjustment level, and n2 may be a maximum luminance of the display 230 in FIG. 6. In an embodiment, when the maximum luminance of the display 230 is 400 nits, the luminance adjustment levels may be set as 256 levels, level 0 to level 255. In this case, level m2 may be the highest level, level 255, n2 may be the maximum luminance of the display 230, 400 nits, for example.

In an embodiment, as illustrated in FIG. 6, as the luminance adjustment level increases, the luminance may increase substantially non-linearly (e.g., 0 nits to n1 nits) in a first section (e.g., level 0 to level m1). As the luminance adjustment level increases, the luminance may increase substantially linearly (e.g., n1 nits to n2 nits) in a second section (e.g., level m1 to level m2).

In an embodiment, a luminance n1 of the display corresponding to a luminance adjustment level m1 at a point (m1, n1) at which the luminance increases substantially non-linearly and then starts to increase substantially linearly, as the luminance adjustment level increases, may be set as the specified luminance.

In an embodiment, when the maximum luminance of the display 230 is 400 nits, and the luminance adjustment levels are set as 256 levels, level 0 to level 255, m1 may be about 128, and n1 may be about 184 nits. In an embodiment, a luminance adjustment level (level m1) corresponding to the specified luminance (e.g., n1) may be a value corresponding to about 50% of the highest luminance adjustment level (e.g., level m2).

In an embodiment, when the current luminance of the display 230 is less than the specified luminance, and an image is displayed at a refresh rate lower than a refresh rate corresponding to the FPS of the image, image quality may be degraded.

In an embodiment, although the graph of FIG. 6 shows a function between luminance adjustment levels and luminances of the display, the luminance adjustment levels and the luminances of the display may be stored in the form of a table in the memory 240.

In an embodiment, the method of setting a specified luminance described with reference to FIG. 6 is an example, to which the disclosure is not limited. In an embodiment, the specified luminance may be set differently from the method described with reference to FIG. 6 according to a panel characteristic of the display 230 or a platform policy, for example.

In operation 505, when identifying that the luminance of the display is less than the specified luminance in operation 503, the processor 250 may determine a refresh rate corresponding to the FPS of the image as a refresh rate for displaying a scene of the image to be displayed through the display 230 in an embodiment.

In operation 507, when identifying that the luminance of the display is equal to or greater than the specified luminance in operation 503, the processor 250 may identify the FPS of the image and motion information of the scene of the image to be displayed through the display 230.

In operation 509, in an embodiment, the processor 250 may determine a refresh rate of the display based on the FPS of the image and the motion information of the scene to be displayed through the display 230.

In embodiments, operations 507 and 509 are at least partially the same as or similar to those of operations 303 and 305, and thus a detailed description thereof will be omitted.

In operation 511, in an embodiment, the processor 250 may display the scene of the image through the display 230 based on the determined refresh rate (e.g., the refresh rate determined in operation 505 or operation 509).

In an embodiment, when the luminance of the display is changed from a luminance (e.g., 50 nits) of the display less than the specified luminance to a luminance (e.g., 400 nits) of the display equal to or greater than the specified luminance during display of a first scene of the image through the display 230, the processor 250 may display a second scene subsequent to (e.g., following) the first scene through the display 230 at a refresh rate determined based on the FPS of the image and motion information of the scene to be displayed through the display 230 without immediately changing a current refresh rate (e.g., a refresh rate at which the first scene is displayed). In an embodiment, when the luminance of the display is changed from a luminance (e.g., 50 nits) of the display less than the specified luminance to a luminance (e.g., 400 nits) of the display equal to or greater than the specified luminance during display of the first scene of the image through the display 230, the processor 250 may display the ongoing first scene through the display 230 at the current refresh rate (e.g., the refresh rate at which the first scene is displayed), for example. The processor 250 may determine a refresh rate for the second scene displayed after completion of displaying the first scene based on the FPS of the image and the motion information of the scene to be displayed through the display 230 by an operation (e.g., operations 507 and 509) performed when the luminance of the display is equal to or greater than the specified luminance. The processor 250 may display the second scene at the refresh rate determined based on the FPS of the image and the motion information of the scene to be displayed through the display 230.

In an embodiment, when the luminance of the display is changed from a luminance (e.g., 400 nits) of the display equal to or greater than the specified luminance to a luminance (e.g., 50 nits) of the display equal less than the specified luminance during display of the first scene of the image through the display 230, the processor 250 may display the second scene subsequent to (e.g., following) the first scene through the display 230 at a refresh rate corresponding to the FPS of the image without immediately changing the current refresh rate (e.g., the refresh rate at which the first scene is displayed).

In the above embodiment, even when the luminance of the display is changed during display of the first scene of the image, the ongoing first scene is displayed at the current refresh rate, by way of example, to which the disclosure is not limited. In an embodiment, when the luminance of the display is changed during display of the first scene of the image (e.g., from a luminance of the display equal to or greater than the specified luminance to a luminance of the display less than the specified luminance, or from a luminance of the display less than the specified luminance to a luminance of the display equal to or greater than the specified luminance), the processor 250 may determine a refresh rate by performing operation 505 or operation 509 according to the changed luminance of the display, for example. The processor 250 may display the ongoing first scene through the display 230 at the refresh rate determined in operation 505 or operation 509.

In an embodiment, as described with reference to FIGS. 5 and 6, when the current luminance of the display 230 is less than the specified luminance, the processor 250 may prevent the degradation of image quality by displaying a scene of an image at a refresh rate corresponding to the FPS of the image through the display 230.

Figure 7:
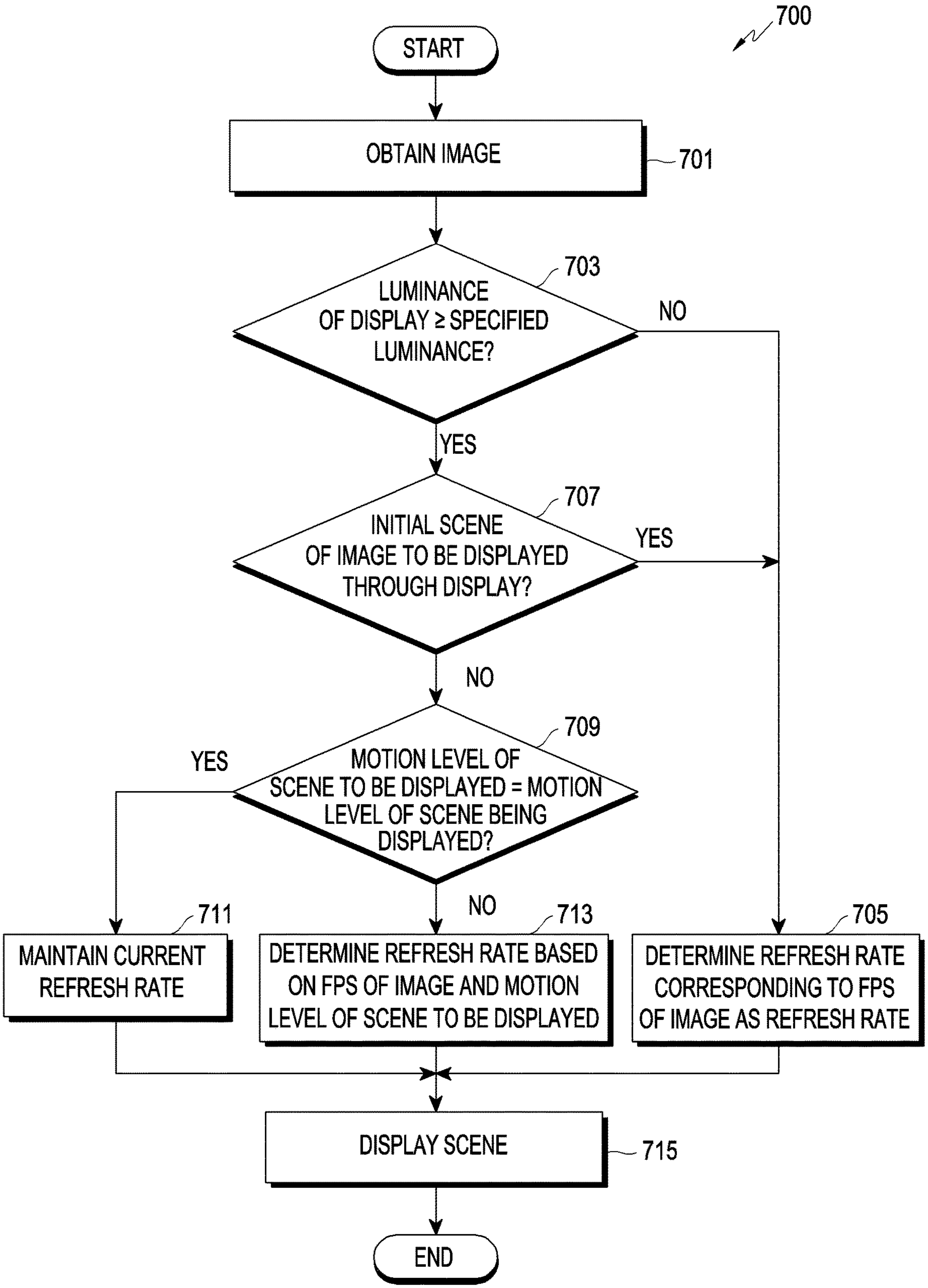
FIG. 7 is a flowchart illustrating an embodiment of a method of controlling a refresh rate.

FIG. 7 is a flowchart 700 illustrating an embodiment of a method of controlling a refresh rate.

Referring to FIG. 7, in an embodiment, the processor 250 may obtain an image in operation 701.

In embodiments, operation 701 are at least partially the same as or similar to those of operation 401, and thus a detailed description thereof will be omitted.

In operation 703, in an embodiment, the processor 250 may identify whether the luminance of the display is equal to or greater than a specified luminance.

At least some of the embodiments of operation 703 are the same as or similar to those of operation 503, and thus a detailed description thereof will be omitted.

In operation 705, when identifying that the luminance of the display is less than the specified luminance in operation 703, the processor 250 may determine a refresh rate corresponding to the FPS of the image as a refresh rate for a scene of the image to be displayed through the display 230 in an embodiment.

In operation 707, when identifying that the luminance of the display is equal to or greater than the specified luminance in operation 703, the processor 250 may identify whether the scene to be displayed through the display 230 is an initial scene of the image. In an embodiment, when the image includes at least one scene, the processor 250 may identify whether the scene to be displayed through the display 230 is a scene to be firstly displayed among the at least one scene, for example.

When identifying that the scene to be displayed through the display 230 is the initial scene in operation 707, the processor 250 may determine the refresh rate corresponding to the FPS of the image as the refresh rate for the scene of the image to be displayed through the display 230 in operation 705.

In FIG. 7, operation 703 is shown as being performed before operation 707, to which the disclosure is not limited. In an embodiment, after identifying whether the scene to be displayed through the display is the initial scene of the image in operation 707, the processor may identify whether the luminance of the display in the image is equal to or greater than the specified luminance in operation 703. In an embodiment, when identifying that the scene to be displayed through the display is not the initial scene of the image in operation 707, the processor may identify whether the luminance of the display in the image is equal to or greater than the specified luminance in operation 703, for example.

In operation 709, when identifying that the scene to be displayed through the display 230 is not the initial scene of the image (e.g., the scene to be displayed through the display 230 is identified as a scene following the initial scene) in operation 707, the processor 250 may identify whether a motion level of the scene to be displayed is the same as a motion level of the scene being displayed in an embodiment. In an embodiment, the processor 250 may identify whether the motion level of a first scene being displayed through the display 230 (e.g., a motion level included in metadata) is equal to the motion level of a second scene subsequent to the first scene, for example.

In operation 711, when the motion level of the scene to be displayed is identified as equal to the motion level of the scene being displayed in operation 709, the processor 250 may determine to maintain a current refresh rate. In an embodiment, when the motion level of the first scene being displayed through the display 230 and the motion level of the second scene subsequent to the first scene are identified as equal, the processor 250 may determine to display the second scene at the same refresh rate as the refresh rate at which the first scene is displayed, for example.

In operation 713, when identifying that the motion level of the scene to be displayed is not equal to the motion level of the scene being displayed in operation 709, in an embodiment, the processor 250 may determine a refresh rate for displaying the scene to be displayed based on the FPS of the image and the motion level of the scene to be displayed.

In embodiments, operation 713 are at least partially the same as or similar to those of operation 305, and thus a detailed description thereof will be omitted.

In an embodiment, the processor 250 may display the scene to be displayed through the display 230, through the display 230 based on the determined refresh rate (e.g., the refresh rate determined in operation 705, operation 711, or operation 713) in operation 715.

Since at least some of the embodiments of operation 715 are the same as or similar to those of operation 307, a detailed description thereof will be omitted.

Figure 8:
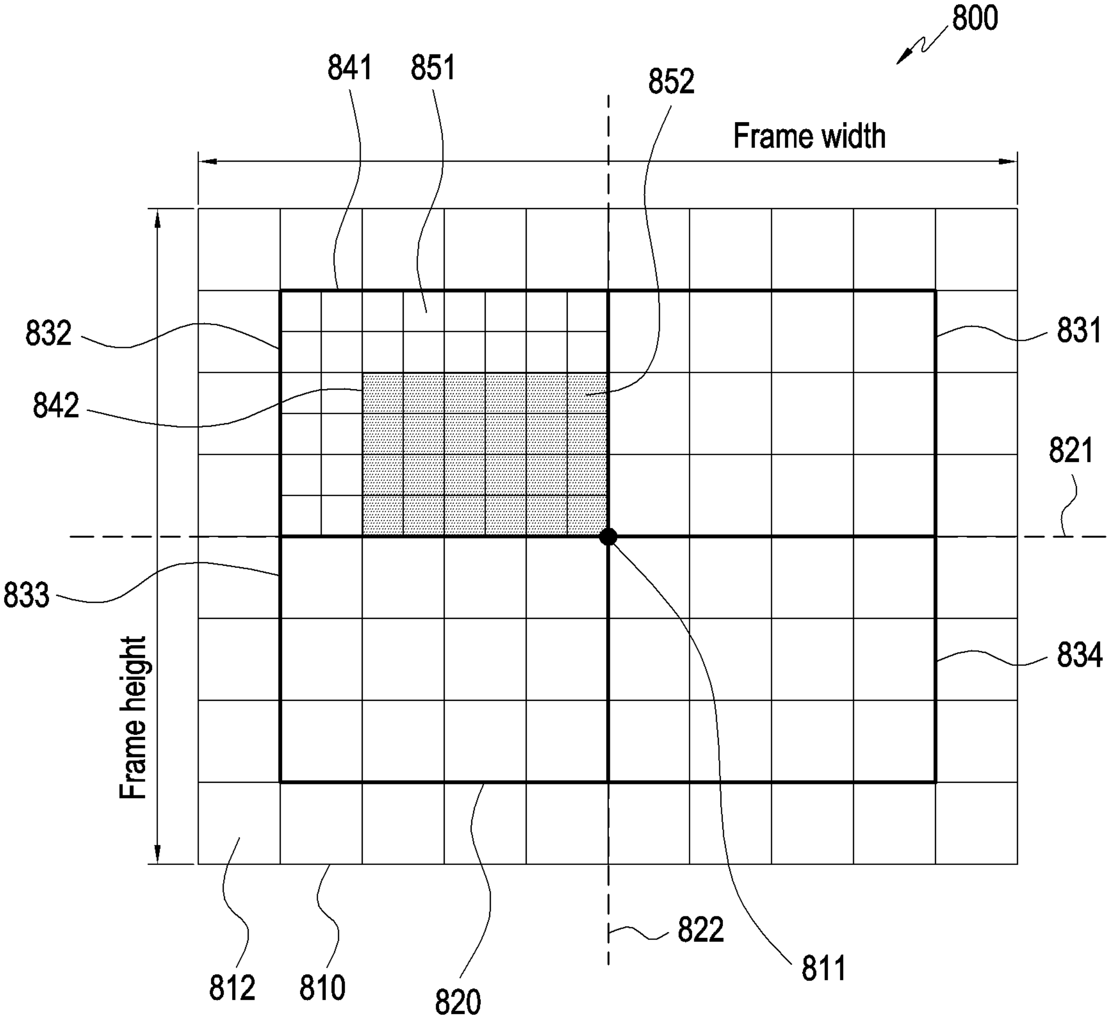
FIG. 8 is a diagram illustrating an embodiment of a method of generating motion information of a scene.

FIG. 8 is a diagram 800 illustrating an embodiment of a method of generating motion information of a scene.

Referring to FIG. 8, in an embodiment, the processor 250 may obtain an image through the camera 220. When obtaining the image, the processor 250 may obtain motion information of at least one scene, to which the disclosure is not limited. In an embodiment, the processor 250 may obtain the motion information of the at least one scene, while or after obtaining the image (e.g., while or after recording a screen) in various manners, for example.

In an embodiment, the processor 250 may set a plurality of blocks in each of a plurality of frames included in the image. In an embodiment, as illustrated in FIG. 8, the processor 250 may set 10*8 (e.g., a product between a value obtained by dividing a frame width by 10 and a value obtained by dividing a frame height by 8) blocks in a frame 810. However, the number of blocks is not limited to the afore-mentioned 10*8, for example. In an embodiment, the frame 810 may include a first area 820 including a center 811 of the frame 810 (the first area 820 including blocks of a first size close to the center 811 of the frame 810) and a second area 812 set outside the first area 820, with respect to the center 811 of the frame 810. In an embodiment, the first area 820 may include four areas with respect to two axes 821 and 822 crossing the center 811 of the frame 810. In an embodiment, the first area 820 may include a $(1\text{-}1)^{th}$ area 831, a $(1\text{-}2)^{th}$ area 832, a $(1\text{-}3)^{th}$ area 833, and a $(1\text{-}4)^{th}$ area 834. In an embodiment, each of the $(1\text{-}1)^{th}$ area 831, the $(1\text{-}2)^{th}$ area 832, the $(1\text{-}3)^{th}$ area 833, and the $(1\text{-}4)^{th}$ area 834 may include an area close to the center 811 of the frame 810 and an area outside the area close to the center 811 of the frame 810, for example. In an embodiment, the $(1\text{-}2)^{th}$ area 832 may include an area 841 and an area 842. In an embodiment, the area 841 may include blocks each having a second size, for example. In an embodiment, the area 841 may include 24 blocks each having the second size. In FIG. 8, a block 851 may represent one block of the second size included in the area 841. The area 842 may include blocks each having the second size, for example. In an embodiment, the area 842 may include 24 blocks each having the second size. In FIG. 8, a block 852 may represent one block of the second size included in the area 842, for example.

In an embodiment, the processor 250 may calculate a motion vector (hereinafter, also referred to as a 'first motion vector') of each (e.g., the block 851) of the 24 blocks of the second size included in the area 841. A motion vector of a block may represent the differences between the values of pixels included in a block set at a first position in a first frame and the values of pixels included a block set at the first position in a second frame following the first frame (e.g., a second frame obtained consecutively to the first frame), for example.

In an embodiment, the processor 250 may calculate a motion vector (hereinafter, also referred to as a 'second motion vector') of each (e.g., the block 852) of the 24 blocks of the second size included in the area 842.

In an embodiment, the processor 250 may calculate a motion vector (hereinafter, also referred to as a 'third motion vector') of the $(1\text{-}2)^{th}$ area 832 in consideration of weights based on the first motion vectors and the second motion vectors. In an embodiment, the processor 250 may calculate the motion vector of the $(1\text{-}2)^{th}$ area 832 by [Equation 1] below, for example.

$$MV3 = (1-p)*\left(\sum_{n=1}^{24} MV1/24\right) + (p)*\left(\sum_{n=1}^{24} MV2/24\right) \quad \text{[Equation 1]}$$

In [Equation 1], MV3 may represent the third motion vector, MV1 may represent each of the first motion vectors, and MV2 may represent each of the second motion vectors. Further, p may represent a weight assigned to the second motion vectors in [Equation 1].

In an embodiment, as described in [Equation 1], the processor 250 may calculate the third motion vector based on the average of the first motion vectors, the average of the second motion vectors, and the weight p (and a weight (1−p)).

In an embodiment, the processor 250 may assign a higher weight p to the second motion vectors than a weight (1−p) assigned to the first motion vectors. In an embodiment, the processor 250 may set p to a value greater than 0.5, for example. In an embodiment, the processor 250 may assign a higher weight to motion vectors (e.g., the second motion vectors) related to an area disposed close to the center 811 of the frame 810 than a weight assigned to motion vectors (e.g., the first motion vectors) related to an area (e.g., the area 841) disposed far from the center 811 of the frame 810 to reflect the fact that a user is sensitive to a change at the center of an image (e.g., the center 811 of the frame), while watching the image (e.g., the fact that the user concentrates on a center part of the image rather than a peripheral part of the image, when watching the image), for example.

In an embodiment, the processor 250 may calculate a motion vector (third motion vector) of each of the $(1\text{-}1)^{th}$ area 831, the $(1\text{-}3)^{th}$ area 833, and the $(1\text{-}4)^{th}$ area 834 in the same manner as in the embodiment of calculating the motion vector (third motion vector) of the $(1\text{-}2)^{th}$ area 832.

In an embodiment, the processor 250 may calculate a motion vector of the first area 820 based on the motion vector of each of the $(1\text{-}1)^{th}$ area 831, the $(1\text{-}2)^{th}$ area 832, the $(1\text{-}3)^{th}$ area 833, and the $(1\text{-}4)^{th}$ area 834. In an embodiment, the processor 250 may determine the largest of the motion vectors of the $(1\text{-}1)^{th}$ area 831, the $(1\text{-}2)^{th}$ area 832, the $(1\text{-}3)^{th}$ area 833, and the $(1\text{-}4)^{th}$ area 834 as the motion vector of the first area 820, for example, to which the disclosure is not limited. In an embodiment, the processor 250 may determine the average of the motion vectors of the $(1\text{-}1)^{th}$ area 831, the $(1\text{-}2)^{th}$ area 832, the $(1\text{-}3)^{th}$ area 833, and the $(1\text{-}4)^{th}$ area 834 as the motion vector of the first area 820, for example.

In an embodiment, the processor 250 may determine the motion vector of the first area 820 as a motion vector of the frame 810 without considering a motion (e.g., motion vector) of the second area 812. As the processor 250 determines the motion vector of the first area 820 as the motion vector of the frame 810, the fact that the user is sensitive to a motion change in an area including the center 811 of the frame 810, when watching the image may be reflected. However, the disclosure is not limited thereto. In an embodiment, the processor 250 may determine the motion vector of the frame 810 in consideration of the motion of the second area 812 (e.g., set the frame 810 as the first area 810 without setting the second area 812), for example.

In an embodiment, the processor 250 may determine a motion level between frames (e.g., between a first frame and a second frame following the first frame) based on the motion vector of the frame 810 and the FPS of the image. In an embodiment, the processor 250 may calculate a motion score between frames based on [Equation 2] below, for example.

$$\text{Motion score between frames} = (\text{motion vector of frame}) * FPS \text{ of image}/100 \quad \text{[Equation 2]}$$

In an embodiment, the processor 250 may calculate the motion score of one scene by averaging scores between frames included in the scene.

In an embodiment, the processor 250 may determine the motion level of one scene based on the motion score of the scene. In an embodiment, in the case where the motion levels of the scene includes four motion levels (e.g., motion level 0 to motion level 3), when the motion score of the scene is equal to or greater than 0 and less than 10, the processor 250 may set motion level 0 for the scene, for example. When the motion score of the scene is equal to or greater than 10 and less than 20, the processor 250 may set motion level 1 for the scene. When the motion score of the scene is equal to or greater than 20 and less than 30, the processor 250 may set motion level 2 for the scene. When the motion score of the scene is equal to or greater than 30 and less than 400, the processor 250 may set motion level 3 for the scene. However, the method of setting a motion level by the processor 250 is not limited to the above embodiment.

In an embodiment, the processor 250 may set a motion level for each of at least one scene included in an image in the same manner as described in the foregoing examples.

In an embodiment, the processor 250 may include the motion level of each of the at least one scene included in the image in the metadata of the image.

Figure 9:
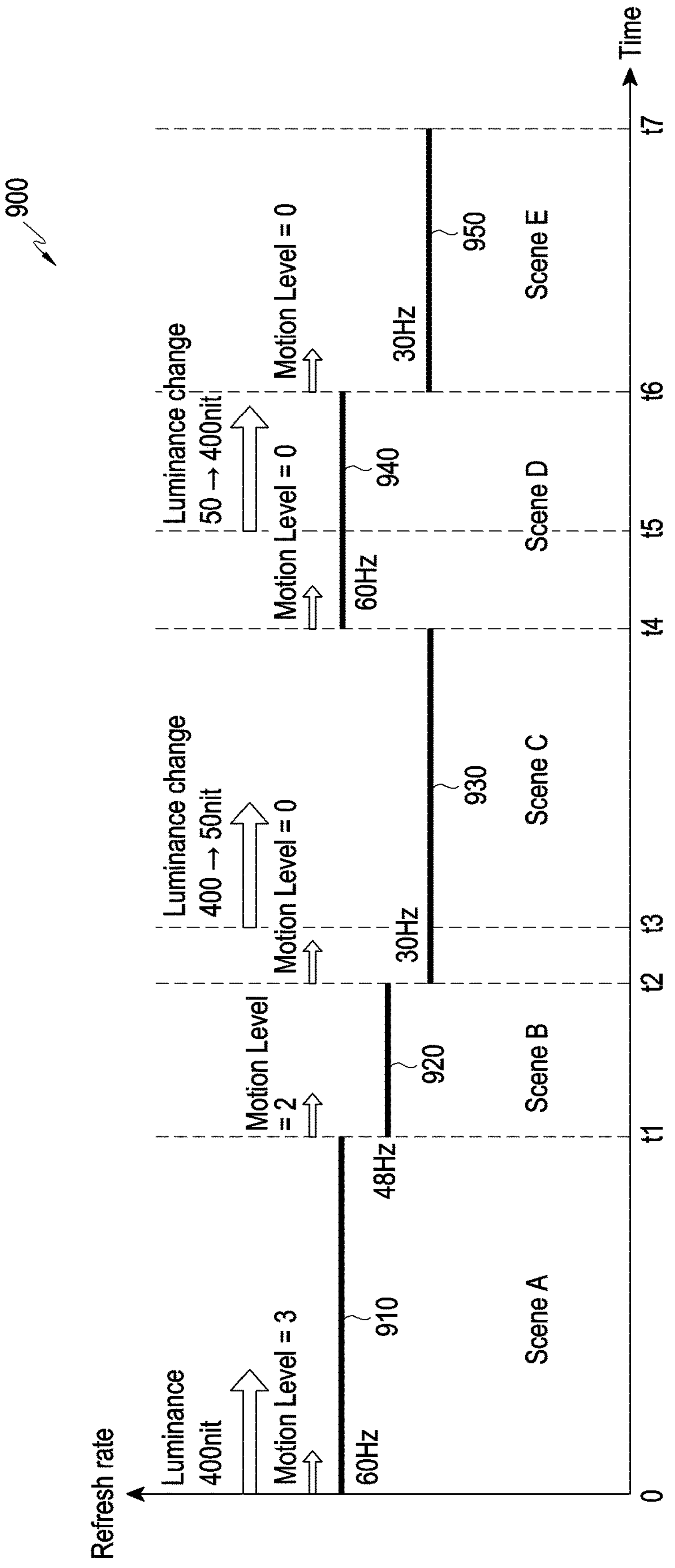
FIG. 9 is a diagram illustrating an embodiment of a method of controlling a refresh rate.

FIG. 9 is a diagram 900 illustrating an embodiment of a method of controlling a refresh rate.

In an embodiment, FIG. 9 may be a diagram illustrating a method of determining a refresh rate based on a luminance change of a display and motion information of each of a plurality of scenes during reproduction of an image. In FIG. 9, it is assumed that the FPS of the image is 60 fps and the motion levels include motion level 0 to motion level 3.

Referring to FIG. 9, in an embodiment, when a first scene (Scene A) is the initial scene of an image, the processor 250 may display the first scene through the display 230 at a refresh rate (e.g., 60 Hz) 910 corresponding to the FPS (60 fps) of the image for the duration (e.g., a time period from t=0 to t=t1) of the first scene without considering a current luminance (e.g., 400 nits) of the display 230 and a motion level.

In an embodiment, the processor 250 may display a second scene (Scene B) following the first scene (Scene A) through the display 230 at a refresh rate (e.g., 48 Hz) 920 determined based on the FPS of the image and a motion level (e.g., motion level 2) of the second scene during the duration (e.g., a time period from t=1 to t=t2) of the second scene.

In an embodiment, the processor 250 may display a third scene (Scene C) following the second scene (Scene B) through the display 230 at a refresh rate (e.g., 30 Hz) 930 determined based on the FPS of the image and a motion level (e.g., motion level 0) of the third scene during the duration (e.g., a time period from t=2 to t=t4) of the third scene.

In an embodiment, the processor 250 may detect a luminance change of the display, while displaying the third scene. In an embodiment, as illustrated in FIG. 9, the processor 250 may detect that the luminance of the display is changed from 400 nits equal to or greater than a specified luminance (e.g., about 184 nits as n1 in FIG. 6) to 50 nits less than the specified luminance at a time point t=t3, while displaying the third scene, for example. The processor 250 may not change a refresh rate while displaying the third scene, despite the detection of the luminance change of the display during the display of the third scene.

In an embodiment, when the luminance of the display less than the specified luminance is maintained after the third scene is displayed (e.g., when the luminance of the display is maintained at 50 nits), the processor 250 may display a fourth scene (Scene D) following the third scene through the display 230 at a refresh rate (e.g., 60 Hz) 940 corresponding to the FPS of the image during the duration (e.g., a time period from t=4 to t=t6) of the fourth scene.

In an embodiment, the processor 250 may detect a luminance change of the display, while displaying the fourth scene. In an embodiment, as illustrated in FIG. 9, the processor 250 may detect that the luminance of the display is changed from 50 nits less than the specified luminance to 400 nits equal to or greater than the specified luminance at a time point t=t5, while displaying the fourth scene, for example. The processor 250 may not change a refresh rate while displaying the fourth scene, despite the detection of the luminance change of the display during the display of the fourth scene.

In an embodiment, when the luminance of the display equal to or greater than the specified luminance is maintained after the fourth scene is displayed (e.g., when the luminance of the display is maintained at 400 nits), the processor 250 may display a fifth scene (Scene E) following the fourth scene through the display 230 at a refresh rate (e.g., 30 Hz) 950 determined based on a motion level (e.g., motion level 0) of the fifth scene during the duration (e.g., a time period from t=6 to t=t7) of the fifth scene.

As described with reference to FIGS. 1 to 9, the method of controlling a refresh rate and the electronic device 101 supporting the same in various embodiments of the disclosure may reduce power consumption of the electronic device 101 without degrading image quality by displaying an image at a refresh rate determined based on the FPS of the image, motion information of each scene of the image, and/or a luminance of the display.

A method of controlling a refresh rate in the electronic device 101 in various embodiments of the disclosure may include obtaining an image, identifying whether a luminance of the display 230 of the electronic device 101 is equal to or greater than a specified luminance, when the luminance of the display 230 is equal to or greater than the specified luminance, identifying FPS of the image and motion information of a scene of the image to be displayed through the display 230, and determining a refresh rate of the display 230 based on the FPS of the image and the motion information of the scene, when the luminance of the display 230 is less than the specified luminance, determining a refresh rate corresponding to the FPS of the image as the refresh rate of the display 230, and displaying the scene of the image through the display 230 based on the determined refresh rate.

In various embodiments, the method may further include, when the luminance of the display 230 is changed from a luminance equal to or greater than the specified luminance to a luminance less than the specified luminance while the scene is displayed through the display 230, determining the refresh rate corresponding to the FPS as a refresh rate for displaying a scene subsequent to the scene.

In various embodiments, the method may further include, when the luminance of the display 230 is changed from a luminance less than the specified luminance to a luminance equal to or greater than the specified luminance while the scene is displayed through the display 230, determining the refresh rate for displaying the scene subsequent to the scene based on the FPS of the image and motion information of the scene subsequent to the scene.

In various embodiments, the specified luminance may be a luminance at a point where the luminance of the display 230 increases non-linearly and then starts to increase linearly, as a luminance adjustment level of the luminance of the display 230 increases.

In various embodiments, identifying the FPS of the image and the motion information of the scene of the image may include identifying the FPS of the image and the motion information of the scene of the image to be displayed through the display 230 based on metadata of the image, and In various embodiments, the metadata may include a duration of at least one scene included in the image and/or motion information of the at least one scene.

In various embodiments, the method may further include, when the scene is an initial first scene of the image, determining the refresh rate corresponding to the FPS of the image as the refresh rate of the display 230.

In various embodiments, the motion information may include a motion level set higher as a motion degree of the scene increases, and determining the refresh rate of the display 230 based on the FPS of the image and the motion information of the scene may include determining the refresh rate of the display 230 as a lower frequency, as the motion level is lower.

In various embodiments, the method may further include setting a plurality of levels corresponding to a plurality of refresh rates, respectively, when the FPS of the image is less than or equal to a specified FPS, determining a refresh rate corresponding to a level lower than a level corresponding to the refresh rate corresponding to the FPS of the image by a first number of levels as the refresh rate of the display based on the motion information, and when the FPS of the image is greater than the specified FPS, determining a refresh rate corresponding to a level lower than the level corresponding to the refresh rate corresponding to the FPS of the image by a second number of levels greater than the first number of levels as the refresh rate of the display based on the motion information.

In various embodiments, the method may further include obtaining an image including a scene, setting a plurality of areas in each of a plurality of frames included in the scene, setting a plurality of blocks in each of the plurality of areas, calculating first motion vectors of a plurality of first blocks set at positions close to a frame center among the plurality of blocks, and second motion vectors of a plurality of second blocks set at positions far from the frame center, calculating a third motion vector of each of the plurality of areas by assigning a first weight to an average of the second motion vectors and assigning a second weight greater than the first weight to an average of the first motion vectors, identifying a largest motion vector among the third motion vectors, and obtaining the motion information of the scene based on the identified largest motion vector.

Further, a data structure used in the afore-described embodiments of the disclosure may be recorded on a computer-readable recording medium through various means. The computer-readable recording medium includes a storage medium such as a magnetic storage medium (e.g., read-only memory (ROM), floppy disk, hard disk, and so on) and an optical reading medium (e.g., compact disc ROM (CD-ROM), digital video disc (DVD), and so on).

What is claimed is:

1. An electronic device comprising:
a display; and
at least one processor including processing circuitry; and
memory storing instructions that, when executed by the at least one processor individually or collectively, cause the electronic device to:
obtain an image,
identify whether a luminance of the display is equal to or greater than a specified luminance, the luminance of the display being an amount of a light, emitted or reflected from a surface of the display, per unit area in a given direction,
based on the luminance of the display being equal to or greater than the specified luminance:
identify FPS (frames per second) of the image and motion information of a scene of the image to be displayed through the display, the FPS of the image being a number of frames, included in the image, displayed in one second, and
based on the FPS of the image and the motion information of the scene, determine a refresh rate of the display, the refresh rate of the display being a number of times at least a portion of the image is displayed per second,
based on the luminance of the display being less than the specified luminance, determine a refresh rate corresponding to the FPS of the image as the refresh rate of the display, and
based on the determined refresh rate, display the scene of the image through the display.

2. The electronic device of claim 1, wherein the at instructions, when executed by the at least one processor individually or collectively, further cause the electronic device to:
based on the luminance of the display being changed from a luminance equal to or greater than the specified luminance to a luminance less than the specified luminance while the scene is displayed through the display, determine the refresh rate corresponding to the FPS as a refresh rate for displaying a scene subsequent to the scene.

3. The electronic device of claim 1, wherein the instructions, when executed by the at least one processor individually or collectively, further cause the electronic device to:

based on the luminance of the display being changed from a luminance less than the specified luminance to a luminance equal to or greater than the specified luminance while the scene is displayed through the display, determine the refresh rate for displaying the scene subsequent to the scene, based on the FPS of the image and motion information of the scene subsequent to the scene.

4. The electronic device of claim 1, wherein the specified luminance is a luminance at a point where a non-linear increase of the luminance of the display is changed to a linear increase, as a luminance adjustment level of the luminance of the display increases.

5. The electronic device of claim 1, wherein the instructions, when executed by the at least one processor individually or collectively, cause the electronic device to identify the FPS of the image and the motion information of the scene of the image to be displayed through the display based on metadata of the image.

6. The electronic device of claim 5, wherein the metadata includes a duration of at least one scene included in the image and/or motion information of the at least one scene.

7. The electronic device of claim 1, wherein the instructions, when executed by the at least one processor individually or collectively, further cause the electronic device to, based on the scene being an initial scene of the image, determines the refresh rate corresponding to the FPS of the image as the refresh rate of the display.

8. The electronic device of claim 1, wherein the motion information includes a motion level which is set higher as a motion degree of the scene increases, and wherein the instructions, when executed by the at least one processor individually or collectively, cause the electronic device to determine, based on the motion level being lower, a lower frequency as the refresh rate of the display.

9. The electronic device of claim 1, wherein the instructions, when executed by the at least one processor individually or collectively, cause the electronic device to:

set a plurality of levels corresponding to a plurality of refresh rates, respectively, identify whether the FPS of the image is greater than a specified FPS, based on the FPS of the image being less than or equal to the specified FPS, determine, based on the motion information, a refresh rate corresponding to a level lower than a level corresponding to the refresh rate corresponding to the FPS of the image by a first number of levels as the refresh rate of the display, and based on the FPS of the image being greater than the specified FPS, determine, based on the motion information, a refresh rate corresponding to a level lower than the level corresponding to the refresh rate corresponding to the FPS of the image by a second number of levels greater than the first number of levels as the refresh rate of the display.

10. The electronic device of claim 1, wherein the instructions, when executed by the at least one processor individually or collectively, further cause the electronic device to:

obtain an image including a scene, set a plurality of areas in each of a plurality of frames included in the scene, set a plurality of blocks in each of the plurality of areas, calculate first motion vectors of a plurality of first blocks set at positions close to a frame center among the plurality of blocks, and second motion vectors of a plurality of second blocks set at positions far from the frame center, calculate a third motion vector of each of the plurality of areas by assigning a first weight to an average of the second motion vectors and assigning a second weight greater than the first weight to an average of the first motion vectors, identify a largest motion vector among the third motion vectors, and obtain the motion information of the scene based on the identified largest motion vector.

11. The electronic device of claim 1, wherein the FPS of the image includes a number of frames, obtained per second while generating the image, of the image, and wherein the luminance of the display is changed based on a user input or a change in an ambient illuminance.

12. A method of controlling a refresh rate in an electronic device, the method comprising:

obtaining an image;

identifying whether a luminance of a display of the electronic device is equal to or greater than a specified luminance, the luminance of the display being an amount of a light, emitted or reflected from a surface of the display, per unit area in a given direction;

based on the luminance of the display being equal to or greater than the specified luminance:

identifying FPS (frames per second) of the image and motion information of a scene of the image to be displayed through the display; and based on the FPS of the image and the motion information of the scene, determining a refresh rate of the display, the refresh rate of the display being a number of times at least a portion of the image is displayed per second;

based on the luminance of the display being less than the specified luminance, determining a refresh rate corresponding to the FPS of the image as the refresh rate of the display; and based on the determined refresh rate, displaying the scene of the image through the display.

13. The method of claim 12, further comprising:

based on the luminance of the display being changed from a luminance equal to or greater than the specified luminance to a luminance less than the specified luminance while the scene is displayed through the display, determining the refresh rate corresponding to the FPS as a refresh rate for displaying a scene subsequent to the scene.

14. The method of claim 12, further comprising:

based on the luminance of the display being changed from a luminance less than the specified luminance to a luminance equal to or greater than the specified luminance while the scene is displayed through the display, determining the refresh rate for displaying the scene subsequent to the scene based on the FPS of the image and motion information of the scene subsequent to the scene.

15. The method of claim 12, wherein the specified luminance is a luminance at a point where a non-linear increase of the luminance of the display is changed a linear increase, as a luminance adjustment level of the luminance of the display increases.

16. The method of claim 12, wherein identifying the FPS of the image and the motion information of the scene of the image comprises identifying the FPS of the image and the motion information of the scene of the image to be displayed through the display based on metadata of the image.

17. The method of claim 16, wherein the metadata includes a duration of at least one scene included in the image and/or motion information of the at least one scene.

18. The method of claim 12, further comprising, based on the scene being an initial scene of the image, determining the refresh rate corresponding to the FPS of the image as the refresh rate of the display.

19. The method of claim 12, wherein the motion information includes a motion level set higher as a motion degree of the scene increases, and wherein determining the refresh rate of the display based on the FPS of the image and the motion information of the scene comprises determining, based on the motion level being lower, a lower frequency as the refresh rate of the display.

20. The method of claim 12, further comprising:

setting a plurality of levels corresponding to a plurality of refresh rates, respectively;

based on the FPS of the image being less than or equal to a specified FPS, determining, based on the motion information, a refresh rate corresponding to a level lower than a level corresponding to the refresh rate corresponding to the FPS of the image by a first number of levels as the refresh rate of the display; and based on the FPS of the image being greater than the specified FPS, determining, based on the motion information, a refresh rate corresponding to a level lower than the level corresponding to the refresh rate corresponding to the FPS of the image by a second number of levels greater than the first number of levels as the refresh rate of the display.

21. The method of claim 12, further comprising:

setting a plurality of areas in each of a plurality of frames included in the scene;

setting a plurality of blocks in each of the plurality of areas;

calculating first motion vectors of a plurality of first blocks set at positions close to a frame center among the plurality of blocks, and second motion vectors of a plurality of second blocks set at positions far from the frame center;

calculating a third motion vector of each of the plurality of areas by assigning a first weight to an average of the second motion vectors and assigning a second weight greater than the first weight to an average of the first motion vectors;

identifying a largest motion vector among the third motion vectors; and obtaining the motion information of the scene based on the identified largest motion vector.

* * * * *